(No Model.)
D. Y. & D. E. HALLOCK.
WEEDER.
No. 600,782.      Patented Mar. 15, 1898.
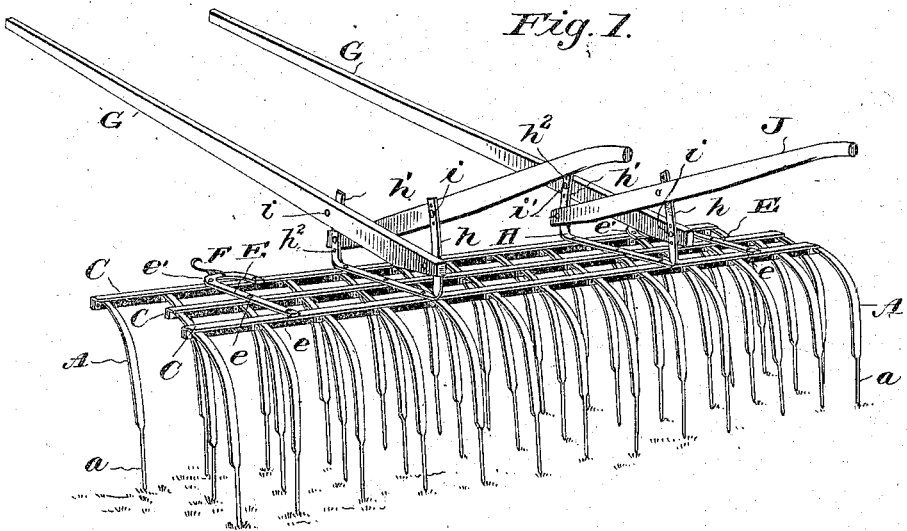
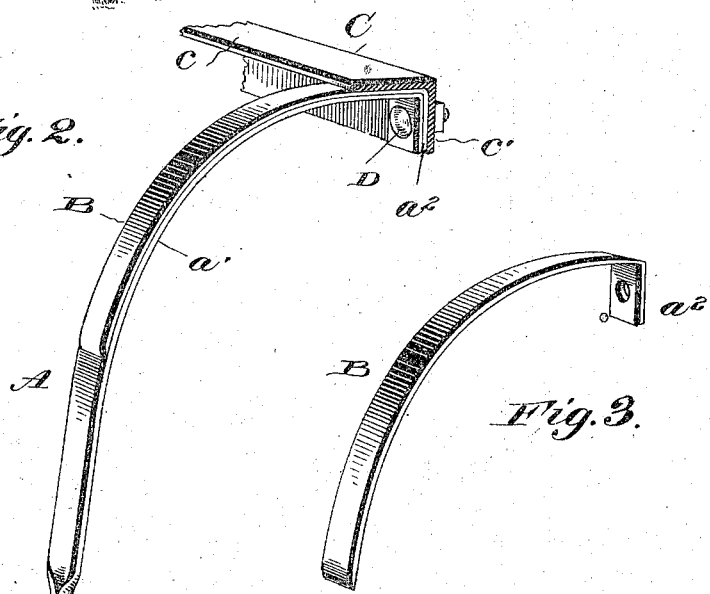
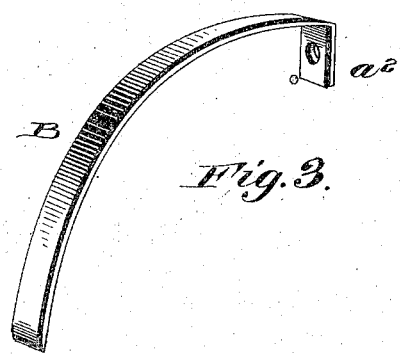
Witnesses
Inventors:
Daniel Y. Hallock
Daniel E. Hallock
by _____ Attorney

UNITED STATES PATENT OFFICE.

DANIEL YOUNGS HALLOCK, OF SOUTHOLD, NEW YORK, AND DANIEL EARNST HALLOCK, OF YORK, PENNSYLVANIA.

WEEDER

SPECIFICATION forming part of Letters Patent No. 600,782, dated March 15, 1898.

Application filed September 16, 1897. Serial No. 651,913. (No model.)

*To all whom it may concern:*

Be it known that we, DANIEL YOUNGS HALLOCK, a resident of Southold, in the county of Suffolk, State of New York, and DANIEL EARNST HALLOCK, a resident of York, in the county of York, State of Pennsylvania, citizens of the United States, have invented certain new and useful Improvements in Weeders, of which the following is a specification.

Our invention has for its object to improve that class of agricultural implements or machines known as "weeders."

Machines of this class have been in use for many years, and it has been demonstrated that the teeth thereof must be small and round in section and long and flexible, so that when in use they will not dig deeply into the soil nor injure the young plants which are being cultivated. Further, the lower parts of the teeth are preferably substantially straight and so arranged that they incline rearward somewhat in order that they shall trail upon rather than dig into the soil as the implement is being used. No form of tooth which lacks any one of these characteristics has been found to operate satisfactorily in a weeding-machine, and these characteristics differentiate this class of machines from harrows and cultivators, whose primary object is to break up and turn over the soil and which when employed to cultivate a growing crop operate only between the rows. The weeder operates not only between the rows of plants but also in the rows.

The frame of a weeder must be high enough above the ground to pass over the crop, and for that reason great difficulty is experienced with the teeth or weeding-fingers, because if they are made small enough to work well as weeders they lack in strength, and hence break or bend permanently, whereas if they are made sufficiently strong to avoid these objections they are too large and stiff to operate well as weeders.

Our invention consists of a novel form of weeder-tooth which possesses all the advantageous characteristics and requirements of the weeder tooth or finger as heretofore developed and at the same time possesses advantageous features not heretofore attained and which will be presently pointed out.

It consists, further, in combining with a weeding-tooth, especially such a one as we have invented, a reinforcing member whereby the flexibility of the tooth may be varied and it adapted to use upon different kinds of soil and under different circumstances.

The invention further consists in improvements in the frame of the machine, which will be hereinafter pointed out.

In the drawings wherein our invention is illustrated, Figure 1 is a perspective view of a machine embodying our improvements. Fig. 2 is a detail view, enlarged, of one of the teeth or fingers. Fig. 3 is a similar view to Fig. 2, showing the reinforcing part combined with the tooth.

In the drawings, A represents the weeder tooth or finger as a whole. It consists of two parts, the lower, $a$, of which is small and round in cross-section, substantially straight, and inclined to the rear and is intended to operate upon the soil and among the plants, and the upper part $a'$, which is flat and thin, to give flexibility and at the same time the necessary strength. The tooth is preferably formed from a piece of thin flat metal, one end of which is folded together to form the round end portion $a$, while the other part is bent to give the proper shape to the tooth. A tooth thus formed is found to work admirably as a weeder, having the flexibility and elasticity required and by reason of the shape of the lower part not tending to injure the plants being worked, while it has sufficient strength to support the frame of the machine and is not liable to break or become permanently bent while in use.

Another and important advantage which our form of tooth has is that it may be easily strengthened or reinforced at will. This has not heretofore been attainable where all round teeth were used and is a desirable feature from the fact that the top of the soil often becomes so hard by reason of rains and atmospheric conditions that the long flexible all round weeder-teeth heretofore used are not effective. Under such circumstances we combine with the tooth a strengthening-piece which will make the tooth more rigid and cause it to properly stand up to its work. This strengthening or reinforcement of the tooth is made possible by reason of its having a flat upper portion, and the reinforcing part or member consists of a thin plate or piece of metal B, adapted to lie close upon the upper and rear side of the flat portion $a'$ of the tooth, as represented in Fig. 3. This reinforcing-piece can be removed or applied quickly and with but little trouble.

The teeth are perfectly supported upon angle-iron frame-pieces C. These frame-pieces are preferably so arranged that the horizontal webs $c$ thereof are at the top, and the vertical webs $c'$ join the horizontal webs at their front edges, thus causing the inner angles to be below and on the rear sides of the bars. Each tooth has its upper end bent to approximately a right angle to the portion $a'$, as represented at $a^2$, and this bent portion is arranged in the inner angle of the bar C, to which the tooth is attached. Such attachment is made, preferably, by means of a bolt D, which passes through the part $a^2$ of the tooth and the web $c'$ of the bar.

The frame consists of a plurality, preferably three, of the tooth-carrying bars arranged in a substantially horizontal plane and connected together by the preferably J-shaped horizontally-arranged pieces E of flat metal. The curved ends $e'$ of the connecting-pieces are preferably toward the front of the machine and each connected at two places $e\ e$ with the front bar C, so that the connecting-pieces, besides uniting the tooth-bars, also serve to hold them rigidly the proper distance apart, the curved portions $e'$ serving as braces. They also serve as a convenient means for attaching the draft devices, as indicated at F. G G indicate the thills or shafts, which are connected with the frame by brackets H H, secured to the frame and each provided with upward-extending arms $h$ and $h'$. One of these arms—preferably the rear one, $h$—is united by a bolt $i$ with the thill or shaft near its rear end, while the other arm is united with the thill or shaft by a bolt $i'$, which passes through one of a series of holes $h^2$ in the arm $h'$. By changing the bolts $i'$ from one set of holes $h^2$ to another we can insure the frame being horizontal whatever the height of the animal employed to draw the machine.

The handles J are secured to the arms of the brackets H and are preferably adjustable, as clearly indicated in Fig. 1.

The teeth are preferably so arranged upon the frame that they are equal distances apart transversely of the machine.

It is apparent that that feature of our invention which consists in the reinforcing-piece for the tooth might be applied to other forms of agricultural implements, such as harrows and cultivators.

Having described our invention, what we claim, and desire to secure by Letters Patent, is—

1. A flexible tooth for a weeder having a substantially straight, trailing lower end portion, substantially round in cross-section, and small in size, adapted to engage with the soil, and a flat spring yielding upper portion adapted to be secured to the frame of the machine, substantially as and for the purposes hereinbefore set forth.

2. In a weeder, the combination of the flexible teeth having trailing lower ends, substantially round in cross-section and small in size, arranged to engage with the soil, and flat spring yielding upper portions by which the teeth are secured to the frame of the machine, and reinforcing members adapted to bear upon the flat portions of the teeth, substantially as and for the purposes hereinbefore set forth.

3. The combination with the frame, of the teeth supported thereby, each tooth being adapted to rest upon the ground and thereby support the frame, and constructed to have a small round substantially straight and rearwardly-inclined lower portion, $a$, and a flat spring yielding upper portion, $a'$, which is secured to the frame, substantially as set forth.

4. The combination of the frame, consisting of the supporting-bars, and the J-shaped horizontally-arranged connecting-pieces, E, and the teeth carried by the bars, substantially as set forth.

5. The combination of the frame, the thills or shafts, the brackets, H, which connect the frame and the thills, having upward-extending arms $h$, $h'$ and adjustable connections between the bracket-arms and thills, whereby the inclination of the frame and thills relative to each other may be varied, substantially as set forth.

6. The combination of the frame-bars C, the teeth supported by the bars, and each formed with a small round lower portion, $a$, and a flat upper portion, $a'$, the horizontally-arranged J-shaped connecting-pieces, E, uniting and bracing the frame-bars, the thills, the brackets H connecting the frame and the thills, and the adjustable connections between the thills and the said brackets, substantially as set forth.

In testimony whereof we have hereunto set our hands this 15th day of September, 1897.

DANIEL YOUNGS HALLOCK.
DANIEL EARNST HALLOCK

Witnesses:
HOWARD W. HALLOCK,
P. H. AMIO.